(12) United States Patent
Kim et al.

(10) Patent No.: US 7,435,468 B2
(45) Date of Patent: Oct. 14, 2008

(54) MULTI-LAYER STRUCTURE AND METHOD OF DRAWING MICROSCOPIC STRUCTURE THEREIN, OPTICAL DISC MASTER AND METHOD OF FABRICATING THE SAME USING THE MULTI-LAYER STRUCTURE, AND OPTICAL DISC MANUFACTURED USING THE OPTICAL DISC MASTER

(75) Inventors: Joo-ho Kim, Yongin-si (KR); In-sik Park, Gyeonggi-do (KR); Masashi Kuwahara, Tsukubasi (JP); Junji Tominaga, Tsukubasi (JP); Takayuki Sima, Tsukubasi (JP)

(73) Assignees: Samsung Electronics Co., Ltd., Suwon-si (KR); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/849,522

(22) Filed: May 20, 2004

(65) Prior Publication Data
US 2004/0247891 A1    Dec. 9, 2004

(30) Foreign Application Priority Data
May 21, 2003    (JP) .............................. 2003-143624

(51) Int. Cl.
*B32B 9/00* (2006.01)
(52) U.S. Cl. ..................... 428/64.4; 428/432; 428/469; 428/471; 428/472; 428/688; 428/913
(58) Field of Classification Search ................ 428/412, 428/418, 420, 426, 428, 432, 433, 434, 450, 428/469, 64.4, 471–472, 688, 913
See application file for complete search history.

(56) References Cited

U.S. PATENT DOCUMENTS

| | | | | | |
|---|---|---|---|---|---|
| 4,504,548 | A | * | 3/1985 | Esho et al. | 428/426 |
| 4,626,480 | A | * | 12/1986 | Shigeta et al. | 428/836.2 |
| 4,737,408 | A | * | 4/1988 | Kuwahara et al. | 428/335 |

(Continued)

FOREIGN PATENT DOCUMENTS

JP    8-287515    11/1996

(Continued)

*Primary Examiner*—Cathy Lam
(74) *Attorney, Agent, or Firm*—Stein, McEwen & Bui, LLP

(57) ABSTRACT

A multi-layer structure whose volume changes when a temperature exceeds a predetermined threshold value, a microscopic structure drawing method that involves emitting a laser beam onto the multi-layer structure to create a temperature distribution within a beam spot and performing microscopic recording on a portion of the beam spot having a temperature higher than the threshold value, an optical disc master, and a mastering method using the same, where the multi-layer structure includes a substrate and a transformation layer formed on the substrate, wherein a volume of a portion of the transformation layer irradiated by a laser beam changes when the temperature of the portion exceeds a predetermined temperature. The microscopic structure drawing method includes emitting the laser beam onto a predetermined region of the transformation layer and heating the region of the transformation layer irradiated by the laser beam beyond a predetermined temperature so that the heated region can undergo a volume change.

6 Claims, 15 Drawing Sheets

U.S. PATENT DOCUMENTS

| | | | | |
|---|---|---|---|---|
| 5,252,370 | A * | 10/1993 | Tominaga et al. | 428/64.5 |
| 5,648,134 | A * | 7/1997 | Shiratori et al. | 428/64.1 |
| 6,693,873 | B2 * | 2/2004 | Kondo et al. | 369/275.4 |
| 2003/0002428 | A1 | 1/2003 | Cheong et al. | |
| 2003/0138669 | A1 | 7/2003 | Kojima et al. | |

FOREIGN PATENT DOCUMENTS

| | | |
|---|---|---|
| JP | 2000-11450 | 1/2000 |
| JP | 2002-365806 | 12/2002 |
| WO | WO 02/31825 | 4/2002 |

\* cited by examiner

| | |
|---|---|
| L | 117.19 nm |
| RMS | 2.487 nm |
| 1c | DC |
| Ra(1c) | 0.645 nm |
| Rmax | 2.327 nm |
| Rz | 1.899 nm |
| Rz Cnt | 4 |
| Radius | 309.73 nm |
| Sigma | 2.109 nm |

| | |
|---|---|
| Surface distance | 117.55 nm |
| Horiz distance(L) | 117.19 nm |
| Vert distance | 5.942 nm |
| Angle | 2.903° |
| Surface distance | |
| Horiz distance | |
| Vert distance | |
| Angle | |
| Surface distance | |
| Horiz distance | |
| Vert distance | |
| Angle | |
| Spectral period | DC |
| Spectral freq | 0 Hz |
| Spectral Rms amp | 0.177 nm |

FIG. 6D

| | |
|---|---|
| L | 136.72 nm |
| RMS | 1.381 nm |
| 1c | DC |
| Ra(1c) | 0.359 nm |
| Rmax | 1.452 nm |
| Rz | 1.237 nm |
| Rz Cnt | 4 |
| Radius | 239.61 nm |
| Sigma | 3.846 nm |

FIG. 6E

| | |
|---|---|
| Surface distance | 136.85 nm |
| Horiz distance(L) | 136.72 nm |
| Vert distance | 3.178 nm |
| Angle | 1.331° |
| Surface distance | |
| Horiz distance | |
| Vert distance | |
| Angle | |
| Surface distance | |
| Horiz distance | |
| Vert distance | |
| Angle | |
| Spectral period | DC |
| Spectral freq | 0 Hz |
| Spectral Rms amp | 0.168 nm |

MULTI-LAYER STRUCTURE AND METHOD OF DRAWING MICROSCOPIC STRUCTURE THEREIN, OPTICAL DISC MASTER AND METHOD OF FABRICATING THE SAME USING THE MULTI-LAYER STRUCTURE, AND OPTICAL DISC MANUFACTURED USING THE OPTICAL DISC MASTER

CROSS-REFERENCE TO RELATED APPLICATIONS

This application claims the priority of Japanese Patent Application No. 2003-143624, filed on May 21, 2003, in the Japanese Intellectual Property Office, the disclosure of which is incorporated herein by reference.

BACKGROUND OF THE INVENTION

1. Field of the Invention

The present invention relates to a multi-layer structure and method of drawing a microscopic structure therein, an optical disc master and mastering method using the multi-layer structure, and an optical disc manufactured using the optical disc master. More particularly, the invention relates to a multi-layer structure whose volume changes when its temperature exceeds a predetermined threshold, a method of drawing the microscopic structure that involves emitting a laser beam onto the multi-layer structure to create a temperature distribution within a beam spot and performing microscopic recording on a portion of the beam spot having a temperature higher than the threshold, an optical disc master and mastering method using the multi-layer structure, and an optical disc manufactured using the optical disc master.

2. Description of the Related Art

Currently, a resist pattern on a master used to manufacture an optical disc is fabricated by emitting a laser beam onto a photosensitive resist layer to produce an image and then developing the resist layer. The minimum size of the resist pattern is restricted due to the diffraction of the beam.

Thus, as part of the efforts to further reduce the minimum size of the resist pattern, research into new exposure technologies using deep-violet light, laser light, and soft X-rays has been conducted over several years. In particular, a KrF or ArF excimer laser is used to obtain a microscopic resist pattern with a size of about 150 nm. However, for realization of high-density optical discs, it is also necessary to solve problems in associated technologies such as the development of high-performance light sources and improvement of material characteristics for optical elements or resist pattern production.

Moreover, although reducing the diffraction of a beam may solve the above problems, it would likely result in a bulky light source or optical system as well as high energy consumption.

Another way to address the problems is electron beam lithography that uses an electron beam to fabricate nano structures with dimensions of a few nanometers, which is much smaller than in typical optical lithography. However, since electrons must be accelerated or deflected in a vacuum, a separate vacuum vessel and a large electrode or power supply for electron acceleration and deflection are required. Furthermore, a high acceleration voltage (for example, several tens of kilovolts) raises concerns about safety.

Still another approach is disclosed in Japanese Patent Laid-open Application No. 2002-365806, which describes a material and method of drawing a pattern on resist by heat generated by a laser. The proposed method includes heating up a resist layer overlying a layer consisting of an alloy of germanium, antimony, and tellurium ($Ge_2Sb_2Te_5$) to cause chemical reaction using the $Ge_2Sb_2Te_5$ layer as a light absorption thermal transformation layer, and drawing a microscopic pattern. This method not only enables the fabrication of nano-structures with dimensions of 100 nm, but also significantly reduces manufacturing costs due to the use of an inexpensive semiconductor laser as a light source. However, since the resist layer is heated with the light absorption thermal transformation layer, this makes the size and shape of the microscopic pattern unstable.

SUMMARY OF THE INVENTION

The present invention provides a multi-layer structure smaller than the diameter of a laser beam spot, and a method designed to draw the microscopic structure using a central, high-temperature portion of a laser beam spot.

The present invention also provides an optical disc master and mastering method using the multi-layer structure, designed to draw a microscopic structure using typical optical lithography without causing deformation or evaporation of a resist material due to increased heat, and an optical disc manufactured using the same.

According to an aspect of the present invention, there is provided a multi-layer structure including a substrate and a transformation layer formed on the substrate, wherein the volume of a portion of the transformation layer irradiated by a laser beam changes when the temperature of the portion exceeds a predetermined temperature. Here, the transformation layer includes an alloy dielectric layer made of an alloy and a dielectric material or a metal oxide layer. Alternatively, the transformation layer may include a first dielectric layer formed on the substrate, an alloy layer or a metal oxide layer overlying the first dielectric layer, and a second dielectric layer overlying the alloy layer and metal oxide layer.

According to another aspect of the present invention, there is provided a method of drawing a microscopic structure on a multi-layer structure including a substrate and a transformation layer formed on the substrate, wherein the volume of a predetermined region of the transformation layer irradiated by a laser beam changes when the temperature of the portion exceeds a predetermined temperature. The method includes emitting the laser beam onto the predetermined region of the transformation layer and heating the region of the transformation layer irradiated by the laser beam beyond a predetermined temperature so that the heated region undergoes a volume change.

According to another aspect of the present invention, there is provided a master for manufacturing an optical disc including a substrate and a transformation layer formed on the substrate, wherein the volume of a portion of the transformation layer irradiated by a laser beam changes when the temperature of the portion exceeds a predetermined temperature. Here, the transformation layer includes an alloy dielectric layer made of alloy and dielectric material or a metal oxide layer. Alternatively, the transformation layer may include a first dielectric layer formed on the substrate, an alloy layer or a metal oxide layer overlying the first dielectric layer, and a second dielectric layer overlying the alloy layer or metal oxide layer.

According to another aspect of the present invention, there is provided a method of manufacturing a master including a substrate and a transformation layer formed on the substrate, wherein the volume of a predetermined region of the transformation layer irradiated by a laser beam changes when the temperature of the portion exceeds a predetermined temperature. The method includes emitting the laser beam onto a predetermined region of the transformation layer and heating the region of the transformation layer irradiated by the laser beam beyond a predetermined temperature so that the heated region undergoes a volume change.

According to another aspect of the present invention, there is provided a computer readable medium encoded with processing instructions for performing a method of drawing a microscopic structure on a multi-layer structure including a substrate and a transformation layer formed on the substrate, wherein a volume of a predetermined region of the transformation layer irradiated by a laser beam changes when the temperature of the region exceeds a predetermined temperature, the method includes emitting the laser beam onto the predetermined region of the transformation layer; and heating the region of the transformation layer irradiated by the laser beam beyond the predetermined temperature, wherein the heated region undergoes the volume change.

According to another aspect of the present invention, there is provided an apparatus forming optical discs, the apparatus including a stamper molding a polycarbonate optical disc substrate, the stamper having a pit pattern smaller than a diffraction limit of a laser beam used to form the pit pattern; and a coater coating a reflective layer and a protective layer over the molded optical disc substrate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6A through 6E show sectional shapes, tracks, frequency spectra, and other numerical data for the pit pattern shown in FIGS. 5A and 5B, respectively;

DETAILED DESCRIPTION OF THE PREFERRED EMBODIMENTS

Figure 1:
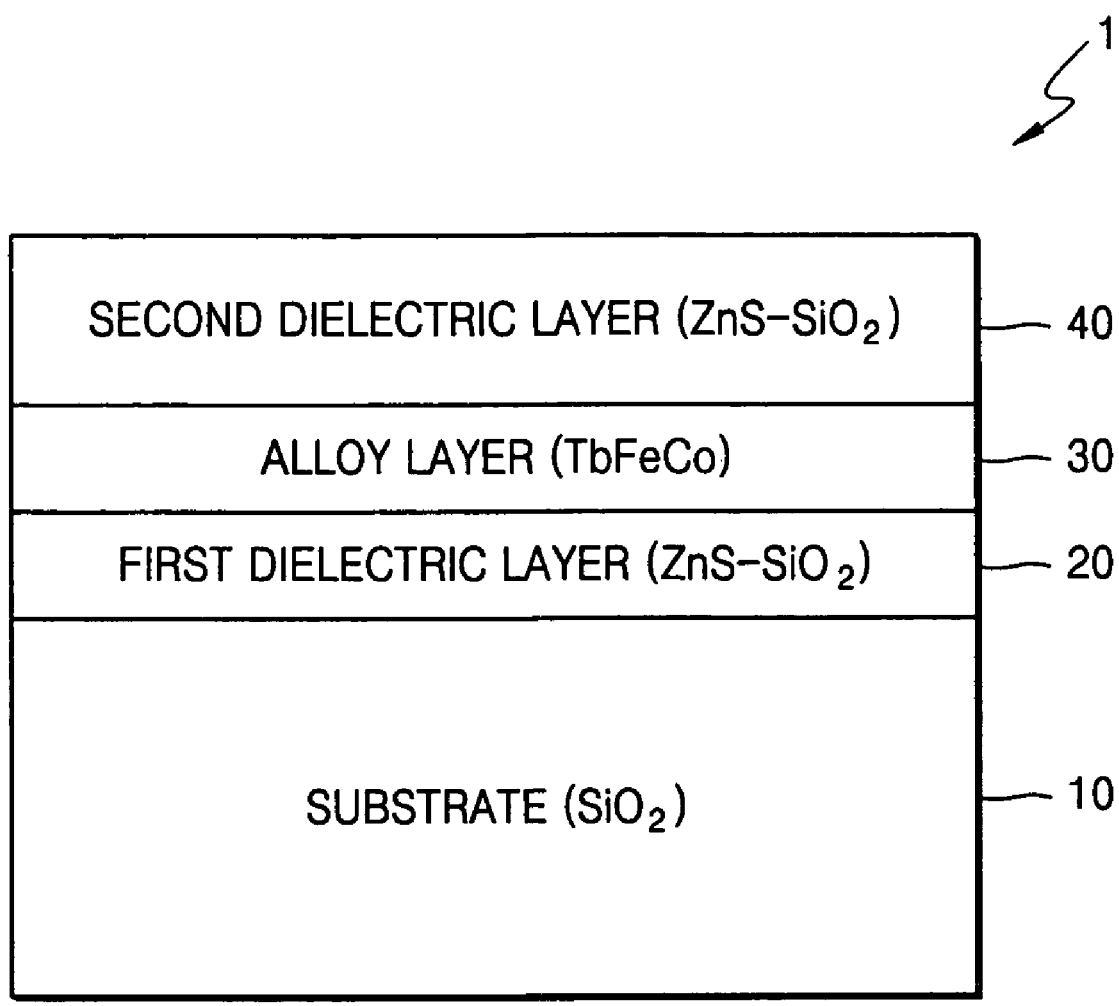
FIG. 1 is a cross-sectional view of a multi-layer structure according to a first embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

First Embodiment

Referring to FIG. 1, a multi-layer structure 1 includes a substrate 10 and a transformation layer formed on the substrate 10. The transformation layer comprises a first dielectric layer 20, an alloy layer 30, and a second dielectric layer 40. When a laser beam radiates a portion of the transformation layer, the volume of a portion of the transformation layer is changed partially depending on whether its temperature exceeds a predetermined temperature or not.

The substrate 10 may be formed from glass ($SiO_2$) or polycarbonate. The first dielectric layer 20 is formed from a mixture of zinc sulfide (ZnS) and silicon dioxide ($SiO_2$) on the substrate 10 to a thickness of about 50 to 250 nm. The alloy layer 30 is formed on the first dielectric layer 20 to a thickness of about 5 to 50 nm. The second dielectric layer 40 is formed, from the same materials as the first dielectric layer 20, on the alloy layer 30 to a thickness of about 10 to 100 nm. The alloy layer 30 is made from a rare earth-transition metal alloy. The rare earth metal used may be terbium (Tb) or neodymium (Nd), and the transition metal may be iron (Fe) or cobalt (Co).

For example, a method of fabricating the multi-layer structure 1 may include forming the first dielectric layer 20 by sputtering ZnS and $SiO_2$ on the substrate 10 made from glass, forming the alloy layer 30 by sputtering either Tb, Fe, and Co, or Nd, Fe, and Co, on the first dielectric layer 20, and forming the second dielectric layer 40 by sputtering ZnS and $SiO_2$ on the alloy layer 30.

Figure 2A:
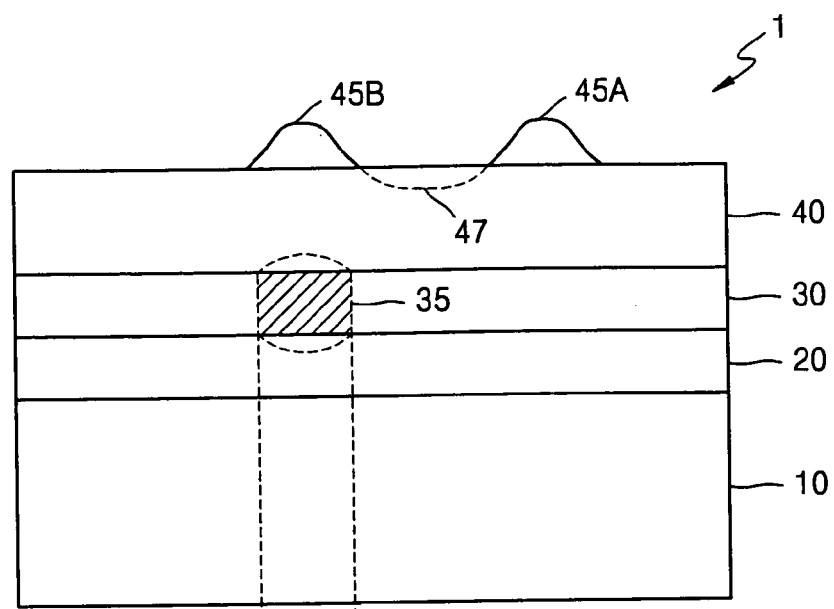
FIGS. 2A and 2B are diagrams for explaining the principle of a change in volume in a multi-layer structure according to the present invention.
Figure 2B:
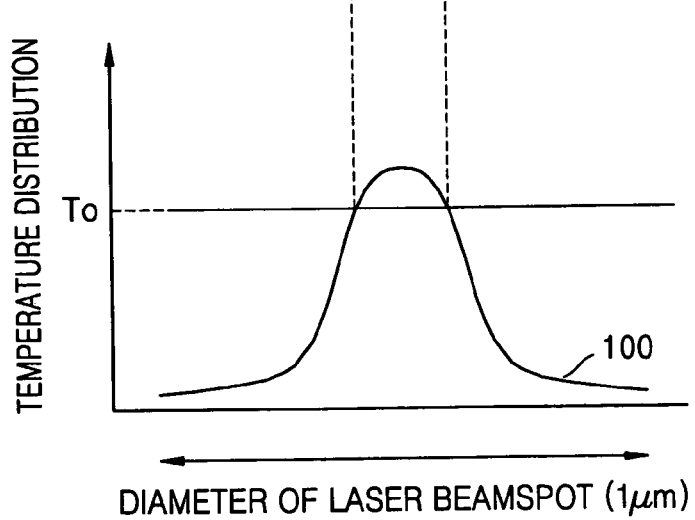

A principle of drawing a microscopic structure below a diffraction limit of an incident beam on the multi-layer structure 1 will now be described Referring to FIG. 2A, a laser beam L is emitted onto the multi-layer structure 1 in the upward direction. When the laser beam is emitted onto the alloy layer 30, a region of the alloy layer 30 on which a spot of the laser beam L is formed is heated. FIG. 2B is a graph of a temperature distribution 100 in the alloy layer 30 versus horizontal location of a laser beam in the multi-layer structure 1 shown in FIG. 2A. As is evident from FIG. 2B, the temperature distribution 100 is Gaussian.

Here, the temperature of a portion of the beam spot can be made higher than a predetermined threshold value $T_0$ by appropriately adjusting the power of the laser beam L. The region of the alloy layer 30 having a temperature higher than the threshold value $T_0$ is denoted by reference numeral 35 in FIG. 2A.

The alloy layer 30 is made from a material whose volume expands when its temperature exceeds the threshold value $T_0$, by forming a compound or causing interdiffusion with the first and second dielectric layers 20 and 40. This expansion causes the surface of the second dielectric layer 40 to rise and then draws a pit 45B on the surface of the second dielectric layer 40. FIG. 2A also shows another pit 45A formed earlier on the right side of the pit 45B in the same manner as the pit 45B.

The diameter of the beam spot depends on the wavelength of the laser beam and the Numerical Aperture (NA) of an objective lens. When a red laser beam is used, the diameter of the beam spot is about 1 μm. In this case, it is impossible to optically reduce the diameter of the beam spot to less than 1 μm due to the diffraction limit. However, since the diameter of the region 35 whose temperature exceeds the threshold value $T_0$ can be made much smaller than the diameter of the beam spot, it is possible to form a pit with a diameter considerably smaller than that of the beam spot. If the alloy layer 30 is made from terbium-iron-cobalt (TbFeCo), the threshold value $T_0$ is around 350° C. The TbFeCo is diffused and penetrates into ZnS—$SiO_2$ forming the first and second dielectric layers 20 and 40. Thus, the pits 45A and 45B are formed by a compound or mixture of TbFeCo diffused from the alloy layer 30 and ZnS—$SiO_2$ forming the second dielectric layer 40.

Conversely, since the volume of the alloy layer 30 does not change in the remaining region having a temperature not exceeding the threshold value $T_0$, the ZnS—$SiO_2$ material of the second dielectric layer 40 is left intact. Here, the present invention obtains the same effect when terbium (Tb) of the alloy layer 30 is replaced with neodymium (Nd).

Using the difference in etching characteristics between a region having pits and a region 47 having no pits, it is possible to selectively etch the region 47 having no pits, which can increase a difference in height from the surface of the second dielectric layer 40 between both regions. Here, the etching may be hydrogen fluoride (HF) based wet etching or dry etching.

When the region 47 not subjected to a volume change is etched after having formed the pits 45A and 45B by the laser beam L as described above, it is possible to increase an aspect ratio of the multi-layer structure 1, which is the height difference between either pit 45A or 45B and etched region 47.

The alloy layer 30 may be replaced with a metal oxide layer comprising at least one metal oxide. The metal oxide may be a noble metal oxide, such as platinum oxide ($PtO_x$), silver oxide ($AgO_x$), palladium oxide ($PdO_x$), or tungsten oxide ($WO_x$), or a transition metal oxide. When the metal oxide layer is used instead of the alloy layer 30, the heated metal oxide layer decomposes into metal and oxygen gas evolves in the region 35 whose temperature exceeds the threshold value $T_0$. Thus, the volume of the region 35 of the metal oxide layer rapidly expands to form the pit 45B.

Figure 3A:
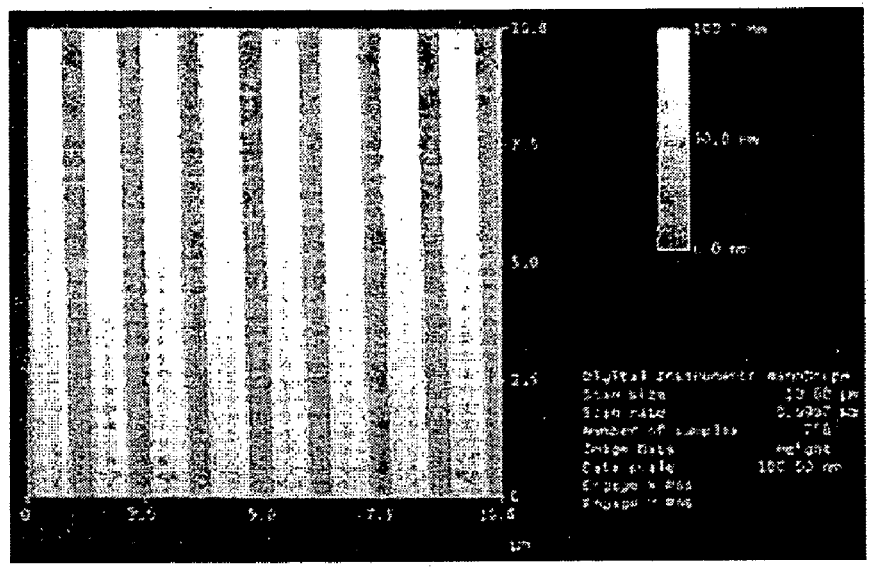
FIGS. 3A and 3B show images of a pit pattern of 120 nm drawn in the multi-layer structure of FIG. 1 and measured using Atomic Force Microscope (AFM)

FIGS. 3A through 6E show the results of measurements made on the surface of the multi-layer structure 1 using atomic force microscope (AFM) and displayed on a computer monitor screen. FIGS. 3A and 3B show images of a pit pattern of 120 nm drawn in the multi-layer structure 1 of FIG. 1 and measured using AFM. FIG. 3A shows an image of the surface of the multi-layer structure 1 enlarged to about 4,200 times its original size, while FIG. 3B shows an image of the surface of the multi-layer structure 1 enlarged to about twice the size of FIG. 3A. The power and the wavelength λ of the laser beam used for drawing the pit pattern were 14.5 mW and 635 nm, respectively, the NA of the objective lens was 0.6, the constant linear velocity (CLV) of the multi-layer structure 1 was 2 m/sec, and the signal duty ratio was 50%.

Figure 3B:
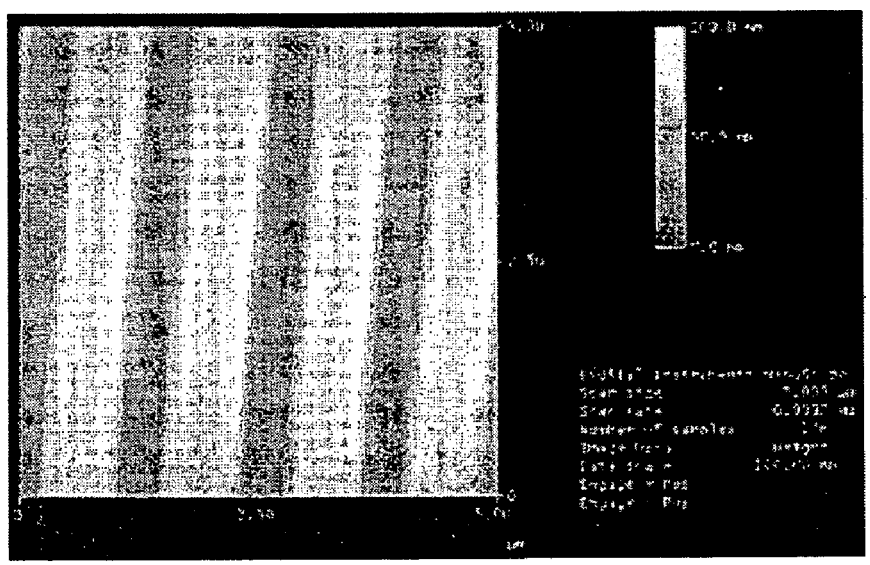

FIG. 3A shows eight tracks formed longitudinally at regular intervals of about 1.2 μm, and FIG. 3B shows four of the eight tracks. Here, the width of each track is about 0.6 μm, and a pit pattern is formed in each track. A white portion of each track denotes a portion of the alloy layer 30 subjected to a volume change, and a dark portion denotes a remaining portion not subjected to a volume change. As described earlier, an aspect ratio of the multi-layer structure 1 can be increased by selectively etching the portion of the alloy layer 30 not subjected to a volume change.

Figure 4A:
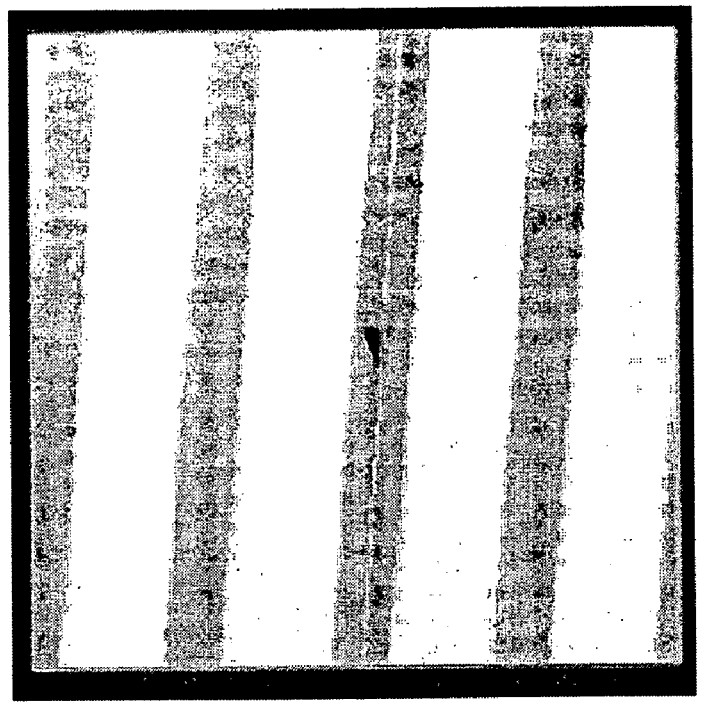
FIGS. 4A through 4E show sectional shapes, tracks, frequency spectra, and other numerical data for the pit pattern shown in FIGS. 3A and 3B, respectively.
Figure 4B:
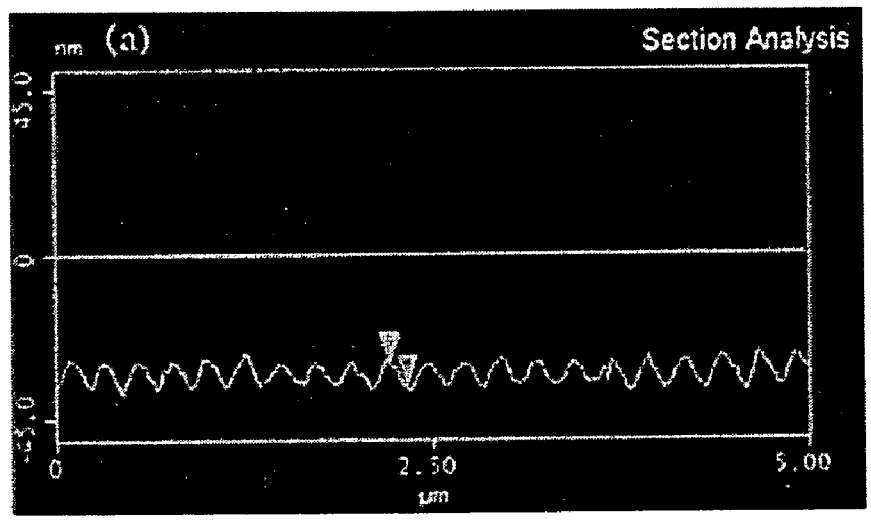
Figures 4C, 4D:
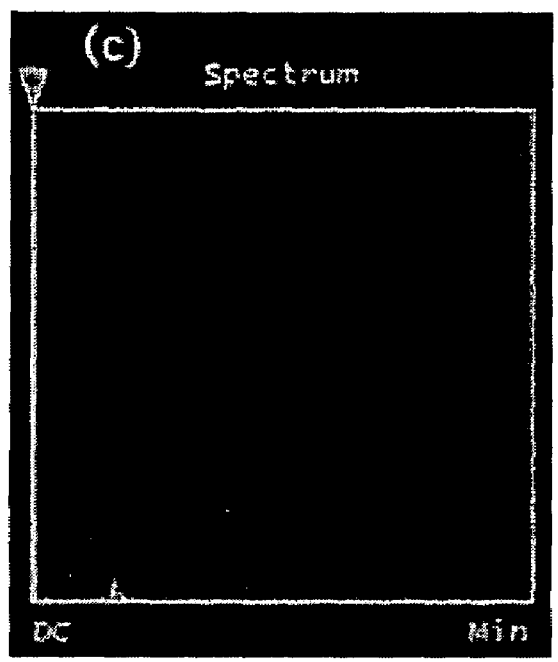

FIG. 4A shows the four tracks of FIG. 3B, and FIG. 4B is a cross-sectional view of the 120 nm pit pattern of FIG. 4A taken along a white line of a third track. As is evident from FIG. 4A, the multi-layer structure 1 has a surface height difference of about 5.9 nm, and the pit pattern is formed with a period of about 240 nm. FIG. 4C shows a frequency spectrum of the pit pattern of FIG. 4B, and FIGS. 4D and 4E show detailed data about the pit pattern.

Figures 4E, 5A:
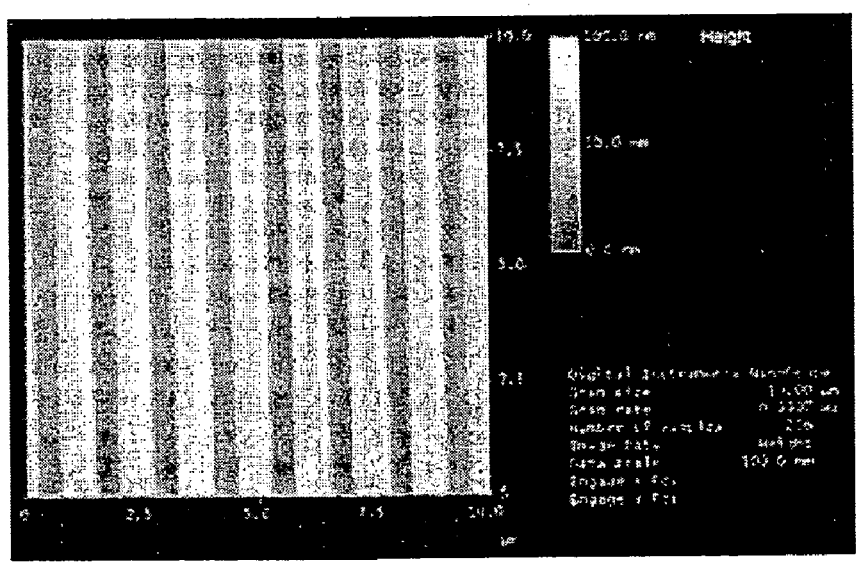
FIGS. 5A and 5B show images of a pit pattern of 100 nm drawn in the multi-layer structure of FIG. 1 and measured using AFM.
Figure 5B:
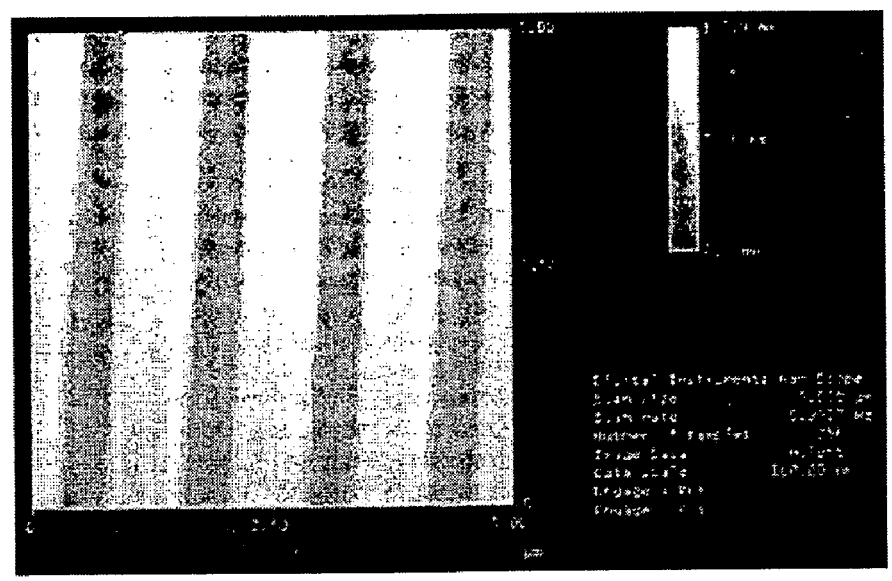

Similarly to FIGS. 3A and 3B, FIGS. 5A and 5B show images of a 100 nm pit pattern drawn in the multi-layer structure 1 of FIG. 1 and measured using AFM. FIG. 5A shows an image of the surface of the multi-layer structure 1 enlarged to about 4,200 times its original size, and FIG. 5B shows an image of the surface of the multi-layer structure 1 enlarged to about twice its enlarged size of FIG. 5A. The power and wavelength λ of the laser beam used for drawing the pit pattern were 15 mW and 635 nm, respectively, the NA of the objective lens was 0.6, the constant linear velocity (CLV) of the multi-layer structure 1 was 2 m/sec, and the signal duty ratio was 50%.

FIG. 5A shows eight tracks formed longitudinally at regular intervals of about 1.2 μm, and FIG. 5B shows four tracks. Here, the width of each track is about 0.6 μm, and a pit pattern is formed in each track. A white portion of each track denotes a portion of the alloy layer 30 subjected to a volume change, and a dark portion denotes a remaining portion not subjected to a volume change.

Figure 6A:
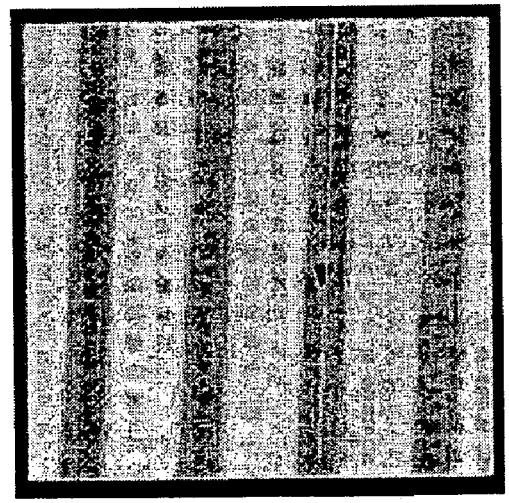
Figure 6B:
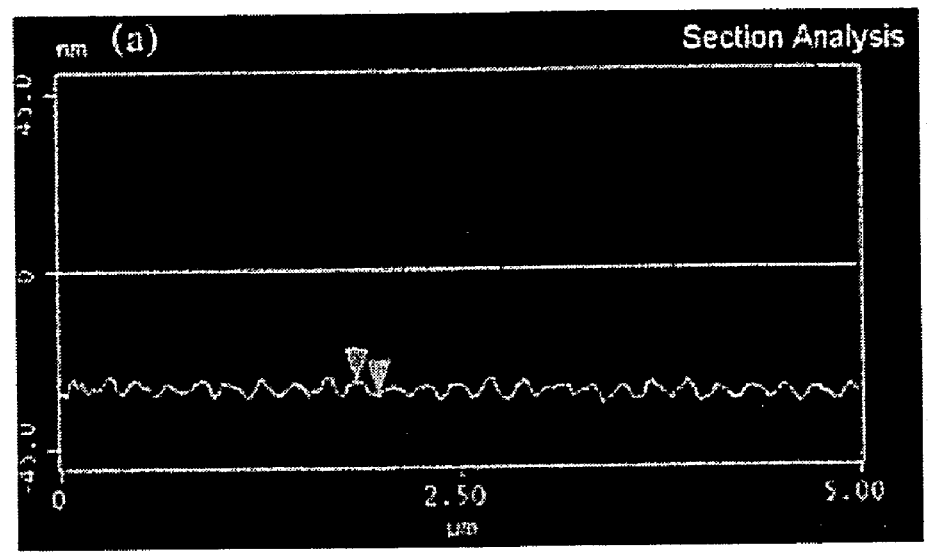
Figure 6C:
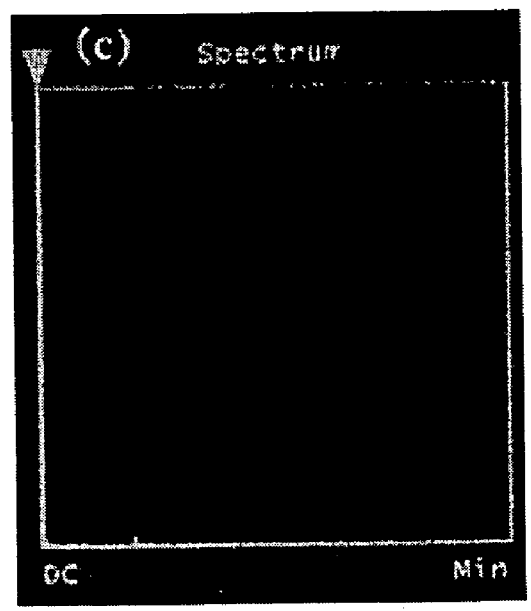

FIG. 6A shows the four tracks of FIG. 5B, and FIG. 6B is a cross-sectional view of the 100 nm pit pattern of FIG. 6A taken along a white line of a third track. As is evident from FIG. 6B, the multi-layer structure 1 has a surface height difference of about 3.1 nm, and the pit pattern is formed with a period of about 200 nm. Like FIGS. 4C through 4D, FIGS. 6C through 6E show frequency spectra of the pit pattern of FIG. 6B, and FIGS. 6D and 6E show detailed data about the pit pattern.

As described above, the wavelength λ of a red laser beam used in the measurements is 635 nm, the NA of the objective lens is 0.6, and the calculated diffraction limit is 530 nm. While it is impossible to write pits with a size below the diffraction limit and a pitch beyond the diffraction limit on a multi-layer structure using conventional technology, the present invention allows a pit pattern with a size below the diffraction limit to be successfully formed on the multi-layer structure 1 according to the first embodiment of the present invention, since pits are formed only on a region having a temperature above the threshold value $T_0$.

One example of the multi-layer structure 1 according to the present invention may be an optical disc master. Thus, when the master configured above is used to manufacture an optical disc, it is possible to produce a pit pattern with a size below the diffraction limit of a laser beam, which is determined by the wavelength of the laser beam, the NA of the objective lens, and other factors, thereby increasing the recording density.

Figure 7:
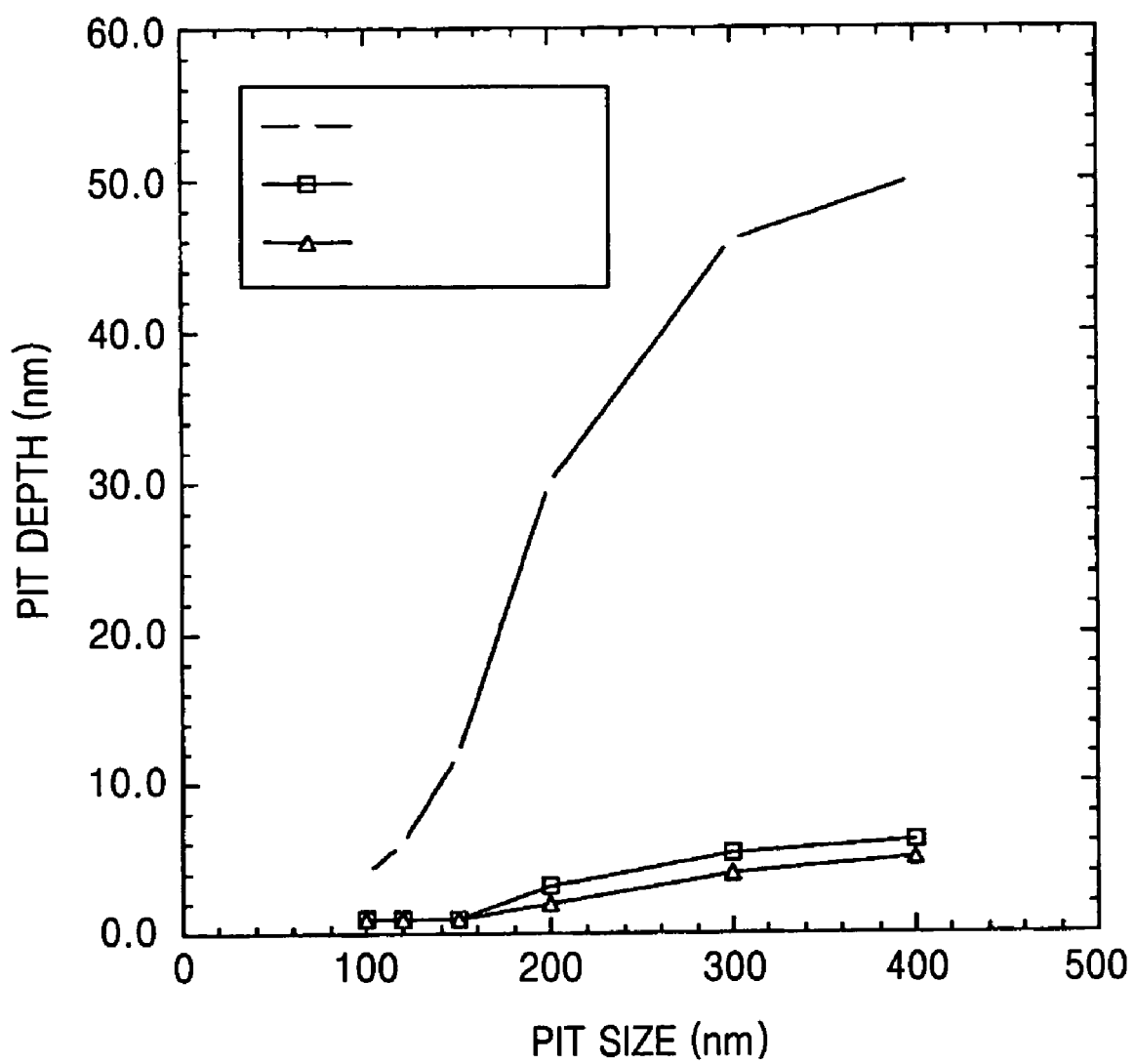
FIG. 7 is a graph illustrating the relationship between pit depth and pit size.

FIG. 7 is a graph of pit depth versus pit size when a dielectric layer is made from a mixture of ZnS and $SiO_2$ (ZnS—$SiO_2$), $SiO_2$, and silicon nitride $SiN_x$, respectively. As is evident from FIG. 7, even when the length of pits written by a laser beam are short, the pits are formed deeper when the dielectric layer is made from ZnS—$SiO_2$ than when the dielectric layer is made from $SiO_2$ or $SiN_x$.

As described above, using the method for drawing microscopic pits according to the present invention increases the density of pits in the multi-layer structure 1, such as an optical disc master, up to about 4 times in a tangential direction and about 2.5 times in a radial direction. Therefore, it is possible to increase the overall pit density up to about 10 times. In addition, use of a blue laser beam allows the manufacture of a master for a 100 GB DVD-ROM.

Second Embodiment

Figure 8:
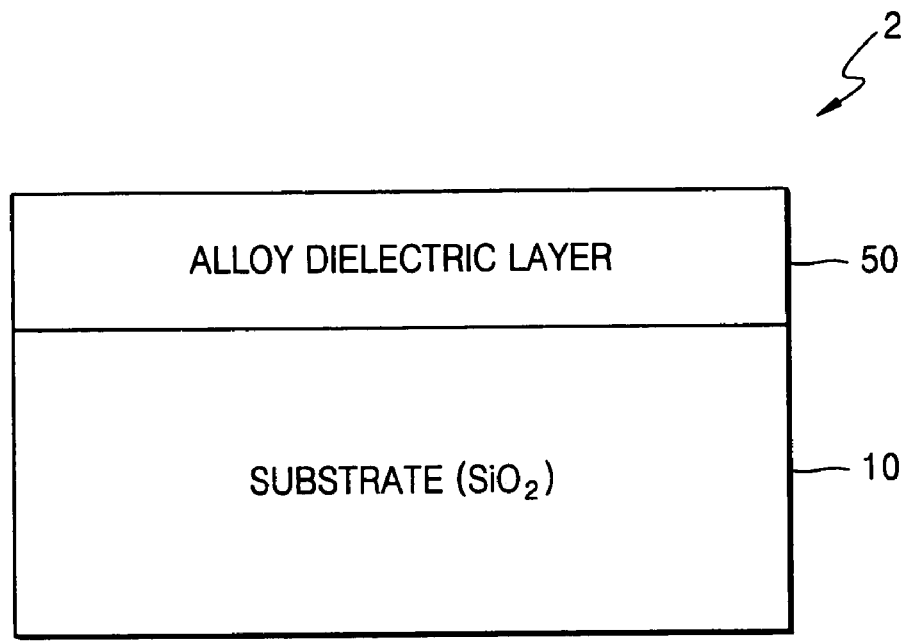
FIG. 8 is a cross-sectional view of a multi-layer structure according to a second embodiment of the present invention.

The transformation layer of the multi-layer structure 1 of FIG. 1 is divided into discrete layers: the first dielectric layer 20, the alloy layer 30, and the second dielectric layer. However, it is possible to combine the discrete layers into a single structure as shown in FIG. 8. FIG. 8 shows a multi-layer structure 2 according to a second embodiment of the present invention. Referring to FIG. 8, the multi-layer structure 2 includes a substrate 10 and a transformation layer formed on the substrate 10. The transformation layer includes an alloy dielectric layer 50 made of alloy and dielectric material. The volume of a portion of the transformation layer irradiated by a laser beam changes when its temperature exceeds a predetermined temperature. Since the substrate 10 has substantially the same structure as that shown in FIG. 1, a detailed explanation thereof will not be given.

The alloy dielectric layer 50 is formed by sputtering the dielectric material of the first and second dielectric layers 20 and 40 shown in FIG. 1 and the alloy of the alloy layer 30 at the same time. The alloy contains a rare-earth metal and transition metal. Examples of the dielectric material and the alloy are ZnS—$SiO_2$ and TbFeCo, respectively. Here, Nd may be adopted instead of Tb as the rare-earth metal. Furthermore, the alloy dielectric layer 50 may be made from metal oxide, such as a noble metal oxide or a transition metal oxide, instead of the alloy comprising the rare-earth metal and transition metal. Examples of the metal oxide include $PtO_x$, $AgO_x$, $PdO_x$, and $WO_x$. The multi-layer structure 2 may further include a dielectric layer (not shown) as a protective layer between the substrate 10 and the alloy dielectric layer 50.

Third Embodiment

Figure 9:
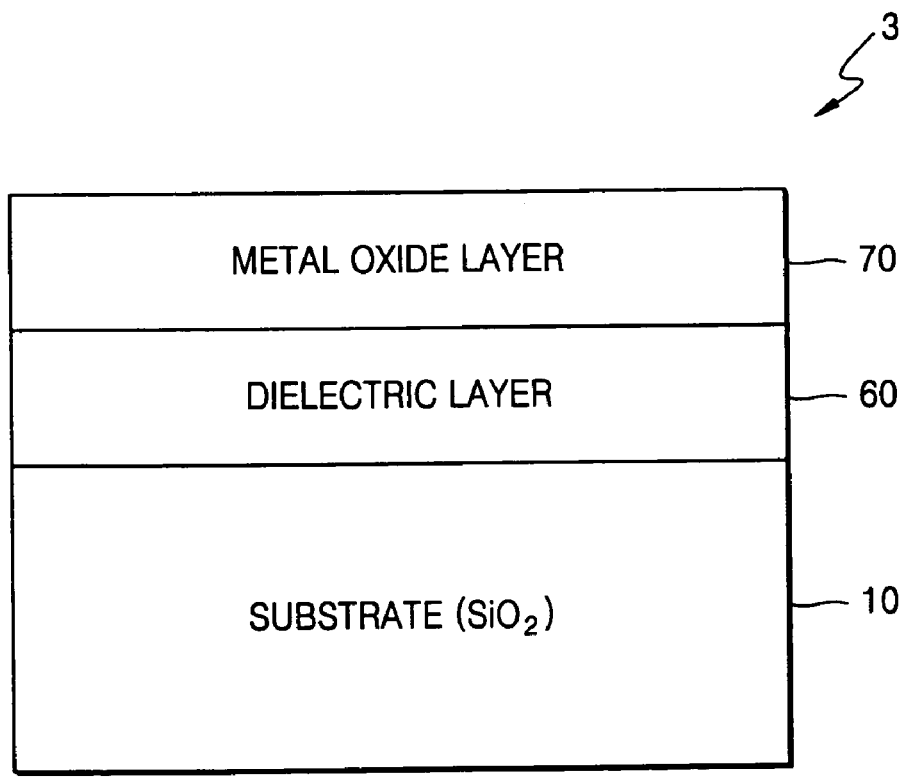
FIG. 9 is a cross-sectional view of a multi-layer structure according to a third embodiment of the present invention.

A multi-layer structure according to the present invention may be realized by adopting a metal oxide layer instead of the alloy dielectric layer 50 shown in FIG. 8. FIG. 9 shows a multi-layer structure 3 according to a third embodiment of the present invention. Referring to FIG. 9, the multi-layer structure 3 includes a substrate 10 and a transformation layer formed on the substrate 10. The transformation layer includes a dielectric layer 60 and a metal oxide layer 70. The volume of a portion of the transformation layer irradiated by a laser beam changes when its temperature exceeds a predetermined temperature. Since the substrate 10 has substantially the same structure as that shown in FIG. 1, a detailed explanation thereof will not be given.

The dielectric layer 60 is formed from dielectric ZnS—$SiO_2$ on the substrate 10 to a thickness of about 130 nm, and the metal oxide layer 70 is formed from metal oxide such as $WO_x$ to a thickness of about 80 nm. Here, the metal oxide may also be transition metal oxide or noble metal oxide such as $PtO_x$, $AgO_x$, and $PdO_x$. In an alternative embodiment to that illustrated in FIG. 9, the metal oxide layer 70 may be formed directly on the substrate 10 without the dielectric layer 60 that acts as a protective layer.

Figure 10:
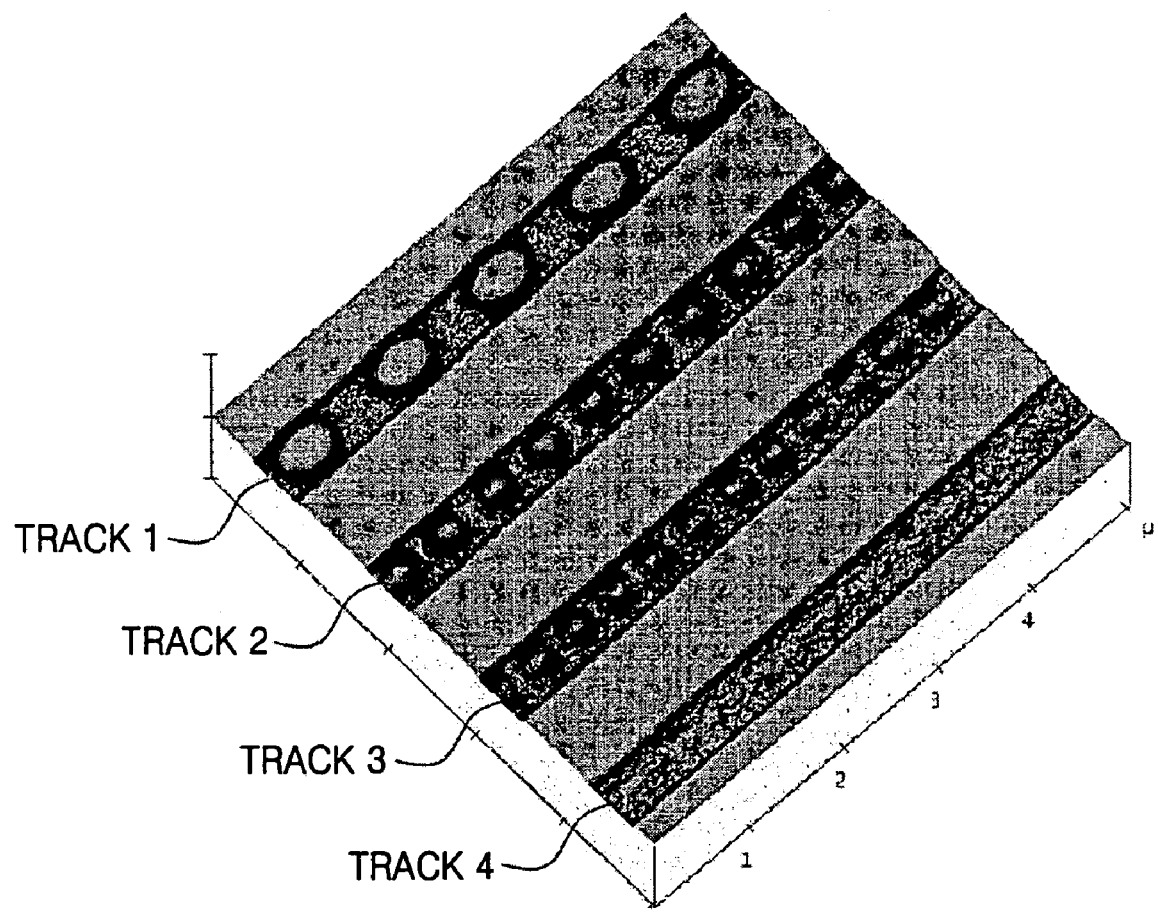
FIG. 10 shows an image of a pit pattern drawn in the multi-layer structure of FIG. 9 and measured using AFM.

FIG. 10 shows an image of a pit pattern drawn in the multi-layer structure 3 of FIG. 9, such as a master, and measured using AFM. This measurement was made for a pit produced when a pulse laser beam of wavelength of 635 nm was incident on the master rotated by an optical disc tester at linear velocity of 6 m/sec. Referring to FIG. 10, pits are produced by changing the volume of a portion of the multi-layer structure 3 irradiated by the pulse laser beam. Here, the diameters of pits formed on tracks 1, 2, and 3 are 400 nm, 250 nm, and 150 nm, respectively. Track 4 is a portion not irradiated by the pulse laser beam. The laser pulses emitted onto tracks 1-3 have frequencies of 6, 12, and 15 MHz, respectively, and a duty ratio of 50%.

The result of this measurement shows that it is sufficiently possible to form pits using metal oxide. According to a volume expansion mechanism in the illustrative embodiment, the metal oxide layer, when heated by the pulse laser beam, is decomposed into metal and oxygen gas that is released, and inflated like a balloon. Even if the heated metal oxide does not undergo decomposition, its volume may expand by releasing extra oxygen within itself.

Mastering And Replication Processes

Figure 11A:
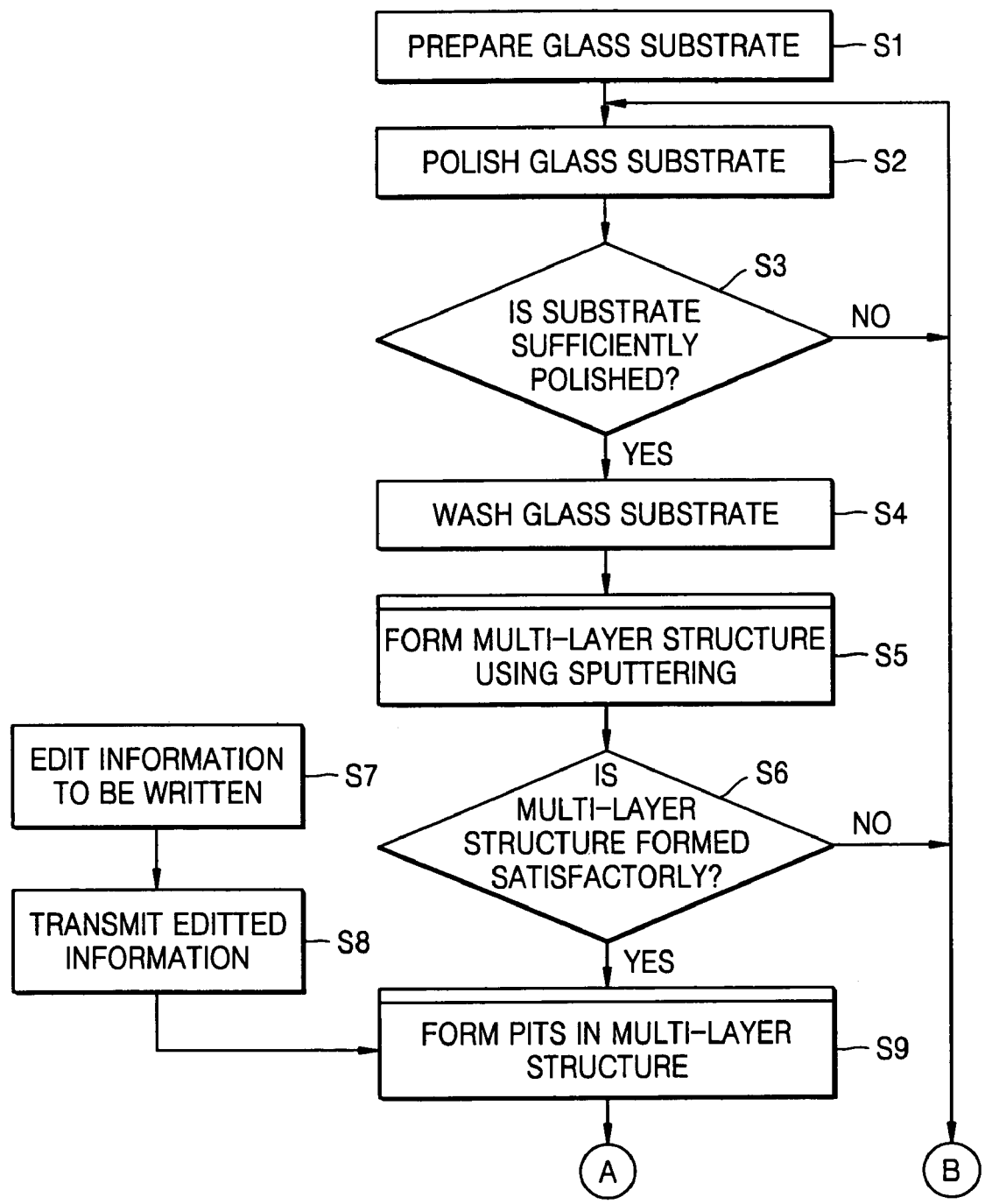
FIGS. 11A and 11B are flowcharts illustrating a mastering process for an optical disc master, and a stamper manufacturing process using the master, according to an embodiment of the present invention.
Figure 11B:
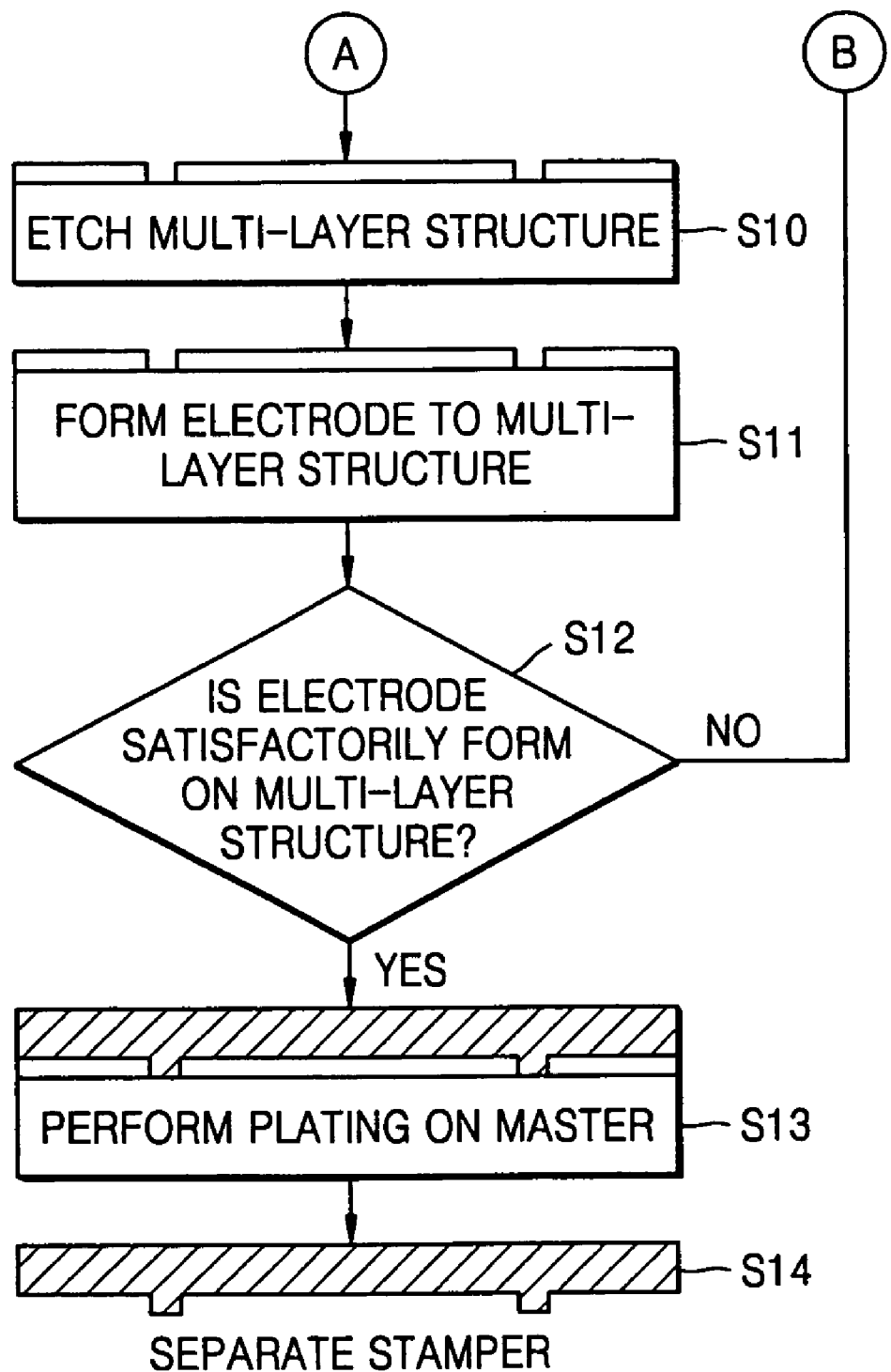

FIGS. 11A and 11B are flowcharts illustrating a mastering process for an optical disc master, and a stamper generating process using the master, according to an embodiment of the present invention. In the mastering process, a master used to manufacture an optical disc is formed by patterning any one of the multi-layer structures 1, 2 or 3. In operation S1, a glass disc is prepared as a substrate. In operation S2, the glass substrate is polished, a check is made as to whether the glass substrate has been sufficiently polished in operation S3, and if so, the glass substrate is washed in operation S4. The multi-layer structure 1, 2, or 3 is then formed by sputtering in operation S5, and it is checked whether any one of the multi-layer structures has been successfully formed in operation S6. In operation S7, information recorded on the master, which will be written onto an optical disc is edited by an editor. In operation S8, the edited information is then transmitted to a signal sending device and recorded on any one of the multi-layer structures, having the shape of a glass disc, in the form of pits in operation S9. The signal sending device converts the information from the editor into a pulse laser beam, and emits the laser beam onto the multi-layer structure 1, 2, or 3, thereby creating pits thereon. The microscopic pit drawing method according to the present invention may be used in operation S9 to draw microscopic pits in any one of the multi-layer structure 1, 2, or 3 with a size below the diffraction limit of the laser beam emitted by the signal sending device.

Next, the multi-layer structure 1, 2, or 3 is etched in operation S10. Here, an aspect ratio of the master can be increased by selectively etching a region having no pits. In operation S11, an electrode is plated on top of the multi-layer structure 1, 2, or 3 to complete the fabrication of the master. In operation S12, it is checked whether the electrode has been satisfactorily coated over the multi-layer structure 1, 2 or 3. The resulting master undergoes plating to produce a stamper in operation S13, which is then separated from the master in operation S14, thereby completing fabrication of the stamper.

Figure 12:
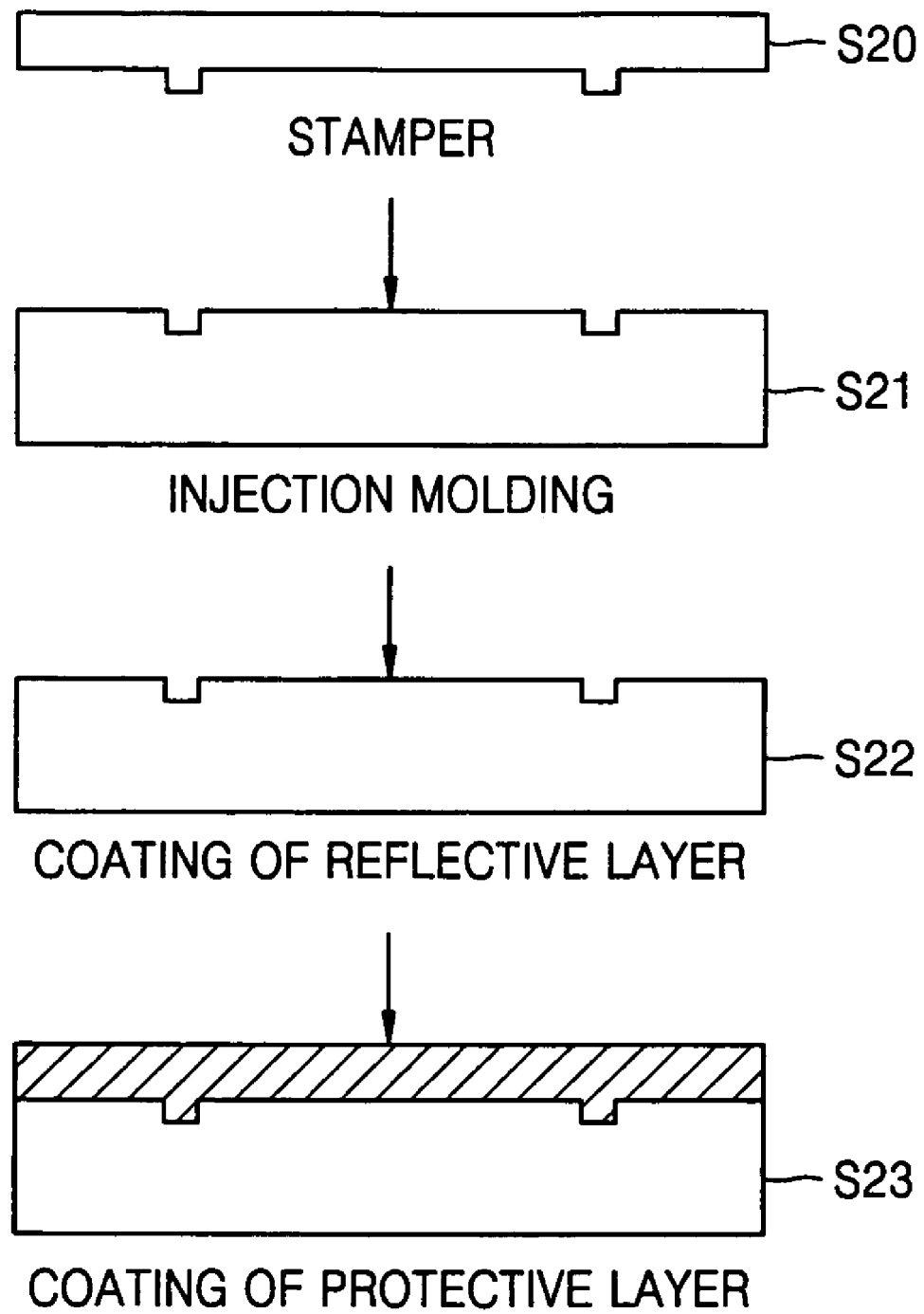
FIG. 12 is a flowchart illustrating a process of replicating an optical disc according to an embodiment of the present invention.

FIG. 12 is a flowchart illustrating a process of replicating an optical disc for mass production according to an embodiment of the present invention. Referring to FIG. 12, the stamper fabricated by the mastering process and stamper fabrication process is used in operation S20 to injection-mold a polycarbonate optical disc substrate in an injection-molding machine in operation S21. A reflective layer and a protective layer are sequentially coated over the injection-molded substrate in operations S22 and S23, thereby duplicating optical discs.

According to the present invention, by virtue of the multi-layer structures, a master, an optical disc fabricated using the master, and a method of manufacturing the optical disc using the master, the conventional microscopic structure drawing mechanism is changed to allow creation of microscopic pits with a size below the diffraction limit of a laser beam, without requiring a large light source and without causing deformation or evaporation of a resist material due to elevated temperature.

The aforementioned method of drawing a microscopic structure on a multi-layer structure may be embodied as a computer program that can be run by a computer, which can be a general or special purpose computer. Thus, it is understood that an apparatus using a laser can be such a computer. Computer programmers in the art can easily reason codes and code segments, which constitute the computer program. The program is stored in a computer readable medium readable by the computer. When the program is read and run by a computer, the method of drawing a microscopic structure on a multi-layer structure is performed. Here, the computer-readable medium may be a magnetic recording medium, an optical recording medium, a carrier wave, firmware, or other recordable media.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multi-layer structure comprising:
   a substrate; and
   a transformation layer comprising:
      a first dielectric layer made from $ZnS-SiO_2$ formed on the substrate, and
      a metal oxide layer overlying the first dielectric layer, the metal oxide layer including a noble metal oxide selected from platinum oxide, silver oxide, palladium oxide, and tungsten oxide;
      wherein a volume of a portion of the transformation layer irradiated by a laser beam spot expands when a temperature of the portion exceeds a predetermined temperature to form a pit pattern on an outermost surface of the multi-layer structure, the pit pattern having a diameter smaller than a diameter of the laser beam spot.

2. The multi-layer structure of claim 1, wherein the substrate is made from glass ($SiO_2$) or polycarbonate.

3. The multi-layer structure of claim 1, wherein the metal oxide layer changes volume by releasing oxygen when heated.

4. The multi-layer structure of claim 1, wherein the metal oxide layer is made of tungsten oxide.

5. The multi-layer structure of claim 1, wherein the metal oxide layer has a thickness of about 80 nm.

6. The multi-layer structure of claim 1, wherein the transformation layer further comprises:
   a second dielectric layer overlying the metal oxide layer;
   wherein the second dielectric layer is made from $ZnS-SiO_2$.

* * * * *